United States Patent
Hsiao et al.

(10) Patent No.: US 6,564,215 B1
(45) Date of Patent: May 13, 2003

(54) UPDATE SUPPORT IN DATABASE CONTENT MANAGEMENT

(75) Inventors: Hui-I Hsiao, Saratoga, CA (US); Inderpal Singh Narang, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/464,836

(22) Filed: Dec. 16, 1999

(51) Int. Cl.[7] .......................... G06F 17/30; G06F 12/00
(52) U.S. Cl. ........................ 707/8; 707/200; 707/202
(58) Field of Search ................. 707/1–10, 101–201, 707/204.1, 202–203; 714/1–4, 40, 43; 709/201, 203, 213, 214; 717/1–5

(56) References Cited

U.S. PATENT DOCUMENTS

| | | | |
|---|---|---|---|
| 4,104,718 A | | 8/1978 | Poublan et al. ............. 364/200 |
| 5,043,871 A | | 8/1991 | Nishigaki et al. ........... 364/200 |
| 5,721,915 A | | 2/1998 | Sockut et al. ............... 395/616 |
| 5,924,094 A | * | 7/1999 | Sutter .......................... 707/10 |
| 6,088,694 A | * | 7/2000 | Burns et al. .................... 707/8 |
| 6,311,288 B1 | * | 10/2001 | Heeren et al. .................. 714/4 |

* cited by examiner

Primary Examiner—Safet Metjahic
Assistant Examiner—Te Yu Chen
(74) Attorney, Agent, or Firm—David A. Hall; Heller Ehrman White & McAuliffe (57) ABSTRACT

A computer system updates a data object that is maintained in data storage external to a database management system (DBMS), after receiving an update request from a DBMS client for the data object, by first scheduling the update request with the DBMS to provide access to the external data object, then initiating a subtransaction in the DBMS for the update request, updating the data object with an in-place update action at the external data storage to thereby produce an updated data object and also updating the DBMS metadata of the data object, next appending information relating to type and time of the update action in an object version table, and then executing a backup operation of the updated data object. This permits update-in-place operations on the external data object, under supervision of the DBMS. The system thereby supports update-in-place operations on external data with access control, backup and recovery, and transaction consistency in accordance with a database management system, while avoiding large copy operations that would consume network resources.

28 Claims, 6 Drawing Sheets

FILE_VERSION TABLE

| ATTRIBUTE | DEFINITION |
| --- | --- |
| FSID | FILE SYSTEM ID |
| INODE | INODE NUMBER OF THE FILE |
| CELLID | CELL ID |
| UPDATER | USERID |
| PENDING_FLAG | FILE STATUS FLAG |
| LAST_MOD_TIME | LAST MODIFICATION TIME OF THE FILE WHEN LINKED |
| UPDATE_TIMESTAMP | TIME THE FILE IS UPDATED |
| BACKUP_SEQUENCE_NUMBER | FOR GARBAGE COLLECTION |
| URL | FILE IDENTIFIER |
| ARCHIVE_FILE_NAME | ARCHIVE FILE NAME |
| UNIQUE_RECOVERY_ID | UNIQUE IDENTIFIER EMBEDDED IN URL+ |
| VERSION_NUM | FILE VERSION NUMBER |

UPDATE SUPPORT IN DATABASE CONTENT MANAGEMENT

BACKGROUND OF THE INVENTION

1. Field of the Invention

This invention relates generally to database management systems and, more particularly, to document control in database update operations.

2. Description of the Related Art

A database management system (DBMS) provides a computer operating environment in which data is typically organized into tables such that the rows and columns of the tables are related to each other. For example, employee records of a company may be organized into tables where each column defines an employee attribute such as name, address, and work location, and each row corresponds to an individual employee record. The DBMS controls user access to the data and manages version control and updating so that many computer system users can have access to the most recent copy of data. Thus, the DBMS provides a data infrastructure to collect and manage modification of the data in the database tables.

Most DBMS implementations feature strict access control to limit the number of users who can modify data tables. An DBMS implementation also will typically have backup and recovery processes, to limit loss of data in the event of equipment failure and to permit reconstructing data if difficulties occur. Most DBMS implementations also support transaction consistency, which generally refers to ensuring that each modification to a data table is verified as to authenticity and accuracy, before and after the modification is performed. Such consistency is especially important, for example, in the banking and travel reservation industries.

Some DBMS designs support controlling access to data that is stored external to the DBMS. That is, the DBMS can control access permission to files of a computer operating system that is external to the DBMS, thereby permitting database users to edit the external data. In this description, the terms "external data" and "files" will be used interchangeably. Thus, users who are located at Personal Computers (PC's) outside of a database facility can easily work on the external data. To edit external data, the user would cause a copy of the file to be made, and then will import that copy into its operating environment, where it can be updated and then returned to the external store. The copy is typically referred to as a shadow copy of the original file. At the conclusion of a user's updating, the updated shadow copy is transferred back to the external system where the original file is stored. The updated copy is then used to replace the original file. One DBMS that integrates with external data files in this way is the "DB2 UDB" product with "DATALINKS" function (also referred to as the "DATALINKS system") from the International Business Machines Corporation (IBM Corporation).

Current DBMS implementations require a linking operation to link an external file to a database. After a file has been linked, permission to access the file is controlled by the database. When a file is linked to a database, no write operations on the files are permitted if coordinated recovery is desired. That is, write operation on the file is disabled. The reason is that the file is copied asynchronous to the linking transaction. When a user wants to edit a linked file, either the file has to be unlinked first, or a copy of the file has to be made and the user then edits the copy. An unlink operation releases the file, but it also unnecessarily changes the database state, which is undesirable. Making a copy of the file is expensive, especially when the size of file is relatively large (e.g., typical audio or video files). At the conclusion of a user's editing/updating activities, the control of the updated file is transferred from the user back to the database through a re-linking operation.

For example, the DATALINKS system described above supports insert, delete, and update actions on database tables. An insert, delete, or update request from a user triggers the link and unlink operations to add/remove control of external files to/from the database if the updated database record references an external file. The data tables in a DATALINKS system are typically stored in accordance with Structured Query Language (SQL) specifications. In the Datalinks system with coordinated between database and files, files may be linked in a partial control mode called "PC3" or in a full control mode called "FC". The PC3 mode places read access to the file under user control, whereas the FC mode places read access under database system control (database grants or rejects read permission upon user request). In both cases, direct write access to the file is disabled.

As noted above, updating or editing files linked to a database (under database control) requires making a shadow copy of the file and/or temporarily removing the file access control from the database. As the size of data files gets ever larger, such large copy operations put a strain on computer and network resources and consume increasing amounts of CPU, network, and disk bandwidth. Temporarily removing the file access control from the database is even less desirable, as it unnecessarily changes the database state or makes the file access unavailable to database users, which could potentially give inconsistent results to applications. Additional DBMS flexibility would be achieved if a user had read and write access to linked files without working through shadow copies, so long as the DBMS still provides access control, backup and recovery processes, and transaction consistency.

From the discussion above, it should be apparent that there is a need for a database management system that provides needed access control features to support update operations on external data, while avoiding large copy operations or potentially inconsistent query results and provides coordinated recovery between database and the relevant version of the file. The present invention fulfills this need.

SUMMARY OF THE INVENTION

The present invention provides a computer system that updates a data object that is maintained in data storage external to a database management system (DBMS), after receiving an update request from a DBMS client for the data object, by first scheduling the update request with the DBMS to access the data object file, then initiating a sub-transaction in the DBMS for the update request to ensure consistency between the data object and corresponding metadata of the data object, next updating the data object with an in-place update action at the external data storage to thereby produce an updated data object and also updating the DLFM/DBMS metadata (DLFM is a sub-component of DBMS) of the data object, then appending information relating to type and time of the update action in a data object file version table, and then executing a backup operation of the updated data object. This permits update-in-place operations on the external data object, under supervision of the DBMS. In this way, the system supports update operations on external data with access control, backup and recovery, and transaction consistency in accordance with a database management system, while avoiding large copy operations that would consume network resources.

In one aspect of the invention, the computer system tracks version information on external data for which an update is pending, where the external data can comprise data objects such as text, images, video, or any other type of binary large object. The data version information is maintained in a file version table that contains modification information used for coordinated recovery between a data object in the external file management system and corresponding metadata in the central database store. Thus, a data object that is stored externally to the database management system is updated by scheduling a plurality of update requests from clients to access the object where the DBMS verifies the access permission of the client, a transaction is initiated by the database management system for one or more update requests to ensure consistency between the external data file and metadata of the file, then the external data file and its corresponding metadata are updated, and update modification information is registered in the version table.

In another aspect of the invention, the external data object is accessed by first setting write permission of the object to the database management system, which thereafter controls access to the data object. A user update request, when granted by the DBMS, will receive a write token that gives the user permission to update the file in-place. The permission is revoked when the user has completed the update operation or when a pre-determined time period has expired. This grant and revoke ensures that desirable file access control features are implemented in accordance with the central database management system. In yet another aspect of the invention, when a previous version of the database is restored, the database management system (or DLFM component) consults the file version table to restore a matching version of the data object. This further ensures that backup and recovery processes, and transaction consistency requirements, are satisfied.

Other features and advantages of the present invention should be apparent from the following description of the preferred embodiment, which illustrates, by way of example, the principles of the invention.

DESCRIPTION OF THE PREFERRED EMBODIMENT

Figure 1:
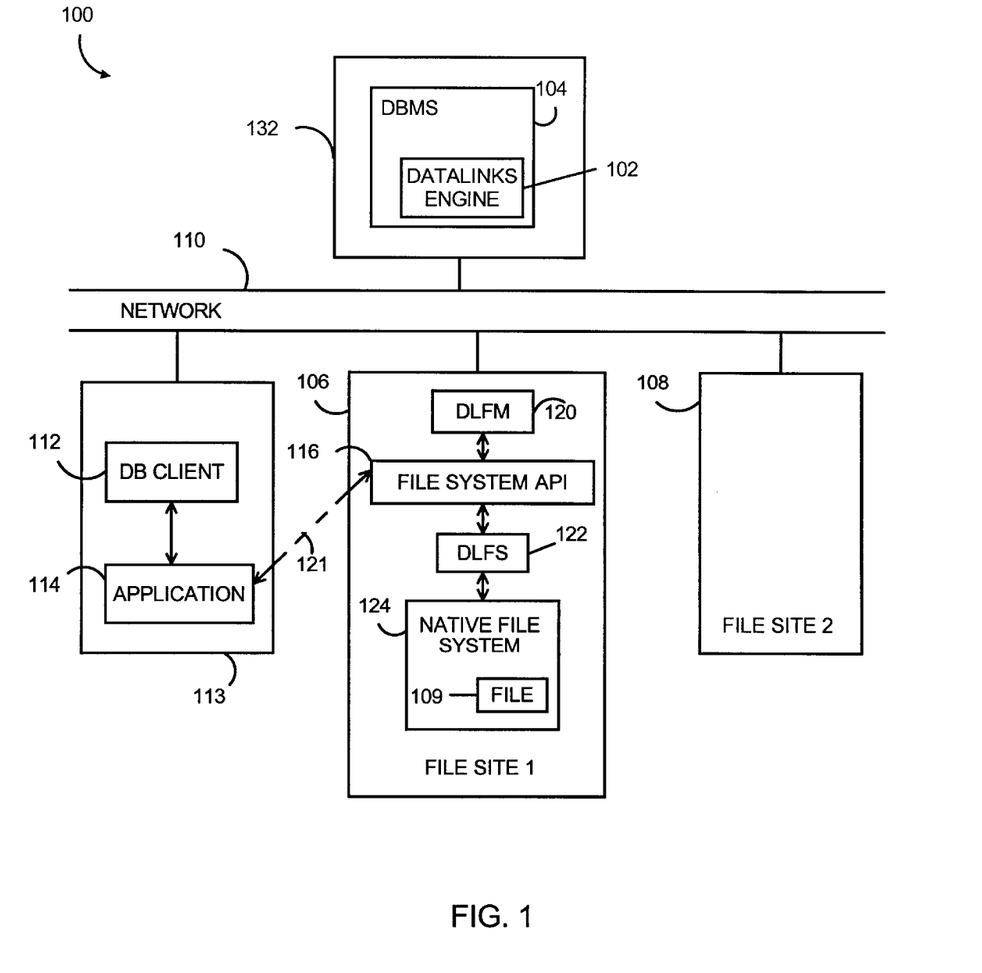
FIG. 1 is a representation of a computer system constructed in accordance with the present invention.

FIG. 1 is a representation of the functional components contained in a computer system 100 constructed in accordance with the present invention. The computer system includes the datalinks engine 102 of a database management system (DBMS) 104 at a first node of a computer network, and two file sites 106, 108 communicating with the DBMS over the network 110. Data objects 109 comprising files are stored at the file sites 106, 108 and are considered external to the DBMS 104. A DBMS client 112 at another network node 113 also communicates with the DBMS 104 over the network. In accordance with the invention, a computer program application 114 at the client node 113 updates a data object 109 stored at one of the file sites 106, 108 by directly accessing and updating the data object in the external store through a file system application program interface (API) 116 at each respective file site without first making a copy of the data object. The client application 114 also accesses metadata of the data object through an SQL interface provided by the DBMS 104 to maintain consistency between the data object and its metadata. This technique permits update-in-place operations on the data object, under supervision of the DBMS 104. In this way, the computer system 100 supports update operations on external data with access control, backup and recovery, and transaction consistency in accordance with the DBMS, while avoiding large copy operations that would consume network resources and also maintaining the same object name from the file system perspective.

It should be understood that two file sites 106, 108 are shown for purposes of illustration, but the system 100 may contain a single file site or additional file sites, each with multiple user machines, or clients. Furthermore, a file site may physically reside in the same computer node as the DBMS. In addition, details of only one file site 106 are shown for illustration, but it should be understood that all file sites of the system will contain similar components to those shown in FIG. 1. Also in FIG. 1, the DBMS 104 is identified with "DB2" to indicate an exemplary database management system such as the "DB2" product available from International Business Machines Corporation (IBM Corporation), but it should be understood that such identification is made for purposes of illustration only. Therefore, references to DB2 will be made interchangeably with references to the DBMS, and should be understood to be general references to any DBMS that is part of a system 100 constructed in accordance with the present invention.

The file sites 106, 108 include a Datalink File Manager (DLFM) 120 and a Datalink File System (DLFS) 122 that are extensions to the traditional DBMS and File System capabilities, respectively. Together they control access to data stored at a respective file site by enforcing access procedures defined by the DBMS. Thus, the DBMS 104 will satisfy a request from a client 112 for access to an external data object 109. The "checkout" operation to update the file is performed through the DLFM 120 internally as a result of the file open request, which is processed by the DLFS 122. In this way, the DLFM stays informed as to which files are being updated, so that write access can be appropriately denied to competing clients and access control, backup and recovery, and transaction consistency can be provided in accordance with the DBMS.

In a conventional DBMS system, the file will be checked out via the DBMS 104, and a copy of a checked out data object 109 will be sent from the file site 106 to the client 112, where the application 114 can be used for update operations on the copy. Following the update operations, the client 112 returns (checks in) the updated data object copy to the file site 106, whereupon the updated data object 109 is stored. As noted above, however, the computer system 100 of the present invention can support update-in-place operations by providing a system having a DBMS in which client applications 114 can directly update data objects through the API 116 of the file system at an external file site 106. The applications 114 can be any one of a variety of client applications, including applications that provide word processing, spreadsheet, database, and Internet-protocol web browser functions. The direct updating from the client application to the external file system API is represented in FIG. 1 by the dashed line 121.

The DBMS 104 and Datalink File Manager (DLFM) 120 may reside on the same network node or may reside on different network nodes. Read or write access to the data objects 109, or files, at an external file site 106, 108 is obtained through the DLFS 122, which communicates with an underlying native file system 124 of the file site 106, 108. In the preferred embodiment, the DLFM 120 and DLFS 122 make use of the same linking engine (such as the "DATALINKS" system) that controls file site access, and must be at the same network node with the corresponding native file system 124. Accordingly, there must be one DLFM and DLFS pair at each file site 106, 108 of the system 100. In accordance with the invention, all concurrent read and write access to files will be serialized by appropriate lock functions in the DLFS 122 of a file site 106, 108.

In the system illustrated in FIG. 1, direct access to a file 109 is provided after a client 112 issues an update call to the DBMS database 104, and the update may be carried out under write permission controlled solely by the DBMS, or under write permission that is shared between the DBMS and the file system 124 of the external site 106, 108. If write permission is solely under the DBMS, then any client application 114 can obtain a valid write token through the datalinks engine 102 of the DBMS 104 and then access the file 109. This technique may be preferable if strict content management is desired. Alternatively, with shared write permission, the DBMS 104 will control issuance of write tokens, while the file system 124 will verify client write authorizations associated with the file to be updated. In this case, write access will be granted if a client has write access permission before a file is linked and has a valid write token.

Computer Construction

Those skilled in the art will appreciate that the FIG. 1 system 100 is comprised of computers at each network node. Thus, the DBMS 104 is resident at a DBMS computer 132 at a node of the network 110, each file site 106, 108 comprises another computer, and the client node 113 comprises another computer of the network. Those skilled in the art will understand that the computers 132, 113, 106, 108 can all have a similar construction.

Figure 2:
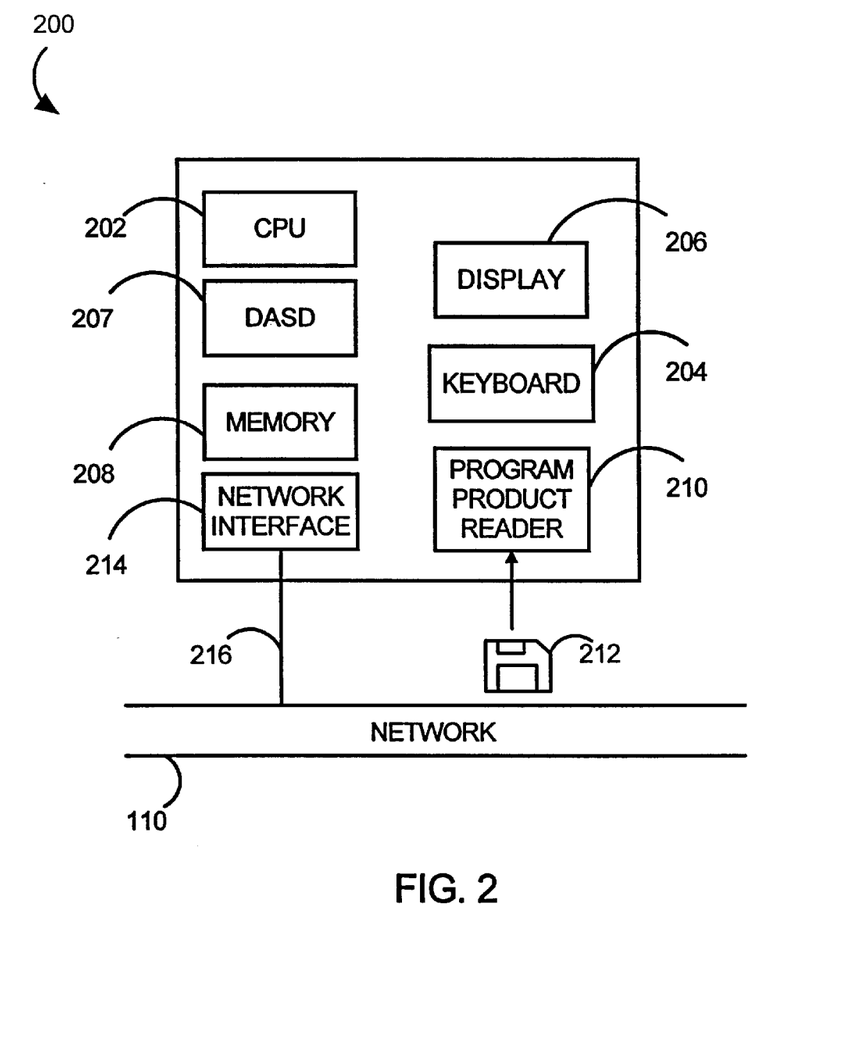
FIG. 2 is a block diagram of a computer in the system illustrated in FIG. 1.

FIG. 2 is a block diagram of an exemplary computer 200 such as might comprise any of the computers 132, 113, 106, 108. Each computer 200 operates under control of a central processor unit (CPU) 202, such as a "Pentium" microprocessor and associated integrated circuit chips, available from Intel Corporation of Santa Clara, Calif., USA. A computer user can input commands and data from a keyboard 404 and can view inputs and computer output at a display 206. The display is typically a video monitor or flat panel display. The computer 200 also includes a direct access storage device (DASD) 207, such as a hard disk drive. The memory 208 typically comprises volatile semiconductor random access memory (RAM). Each computer preferably includes a program product reader 210 that accepts a program product storage device 212, from which the program product reader can read data (and to which it can optionally write data). The program product reader can comprise, for example, a disk drive, and the program product storage device can comprise removable storage media such as a magnetic floppy disk, a CD-R disc, a CD-RW disc, or DVD-RW disc. Each computer 200 communicates with the others over the network 110 through a network interface 214 that enables communication over a connection 416 between the network and the computer.

The CPU 202 operates under control of programming steps that are temporarily stored in the memory 208 of the computer 200. When the programming steps are executed, the Query Interface performs its functions. The programming steps can be received from the DASD 407, through the program product storage device 212, or through the network connection 416. The storage drive 210 can receive a program product 212, read programming steps recorded thereon, and transfer the programming steps into the memory 408 for execution. As noted above, the program product storage device can comprise any one of multiple removable media having computer-readable instructions, including floppy disks and CD storage. Other suitable program product storage devices can include magnetic tape and semiconductor memory. In this way, the processing steps necessary for operation in accordance with the invention can be embodied on a program product. Alternatively, the program steps can be received into the operating memory 208 over the network 110. In the latter method, the computer receives data into the memory 408 through the network interface 214 after network communication has been established over the network connection 216 by well-known methods that will be understood by those skilled in the art without further explanation.

It should be understood that all of the computers 132, 113, 106, 108 of the computer system illustrated in FIG. 1 have a construction similar to that shown in FIG. 2, so that details described with respect to the FIG. 2 computer 200 will be understood to apply to all computers of the system 100. Alternatively, any of the computers 202, 204, 208, 210 can have an alternative construction, so long as they can communicate with the other computers and support the functionality described herein.

File_Version Table Data Structure

Figure 3:
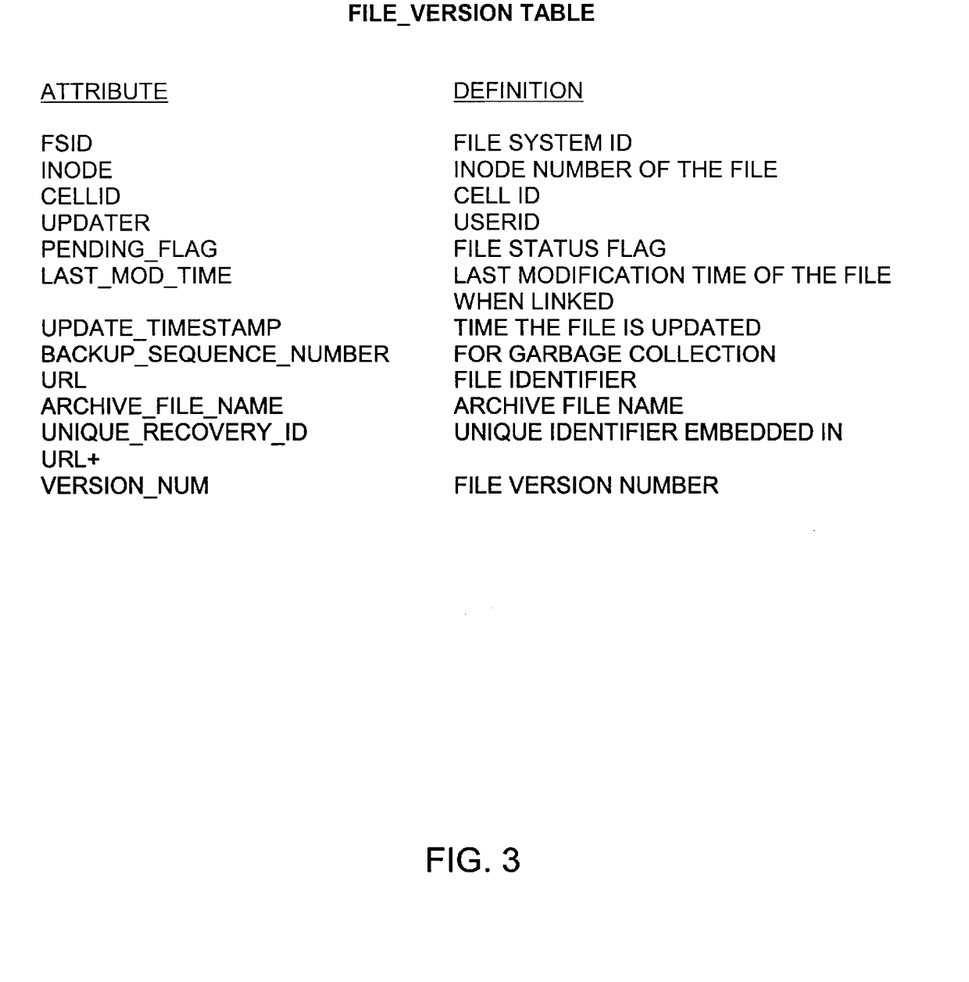
FIG. 3 is a representation of a data table maintained by the DLFM of the FIG. 1 computer system.

To support update in-place operation, the system 100 includes a DLFM with a new DLFM table, identified herein as the "File_Version" table 300, illustrated in FIG. 3. The File_Version table has attributes, or table entries, that will be referenced by entry names for convenience. The File_Version table entries include a file system identifier "fsid", a file system index node number "inode" for the data object being updated, and a cell identifier "cellid" to identify the particular file system cell in a distributed file system. The DLFM File_Version table 300 also will include an entry for a user identifier number "updater", a file status flag "Pending_Flag", a clock time" Last_Mod_Time" to record when a file was linked, an update time "Update_Timestamp" that is set when a data object is updated and closed, and a sequence number "Backup_Sequence_Number" used for garbage collection. A version flag "version" is used to track different file version. Thus, the File_Version table includes file version information and also information on pending updates. Other information maybe included in the File_Version table, according to the particular implementation. The table entries are summarized in FIG. 3.

System Operation

Figure 4:
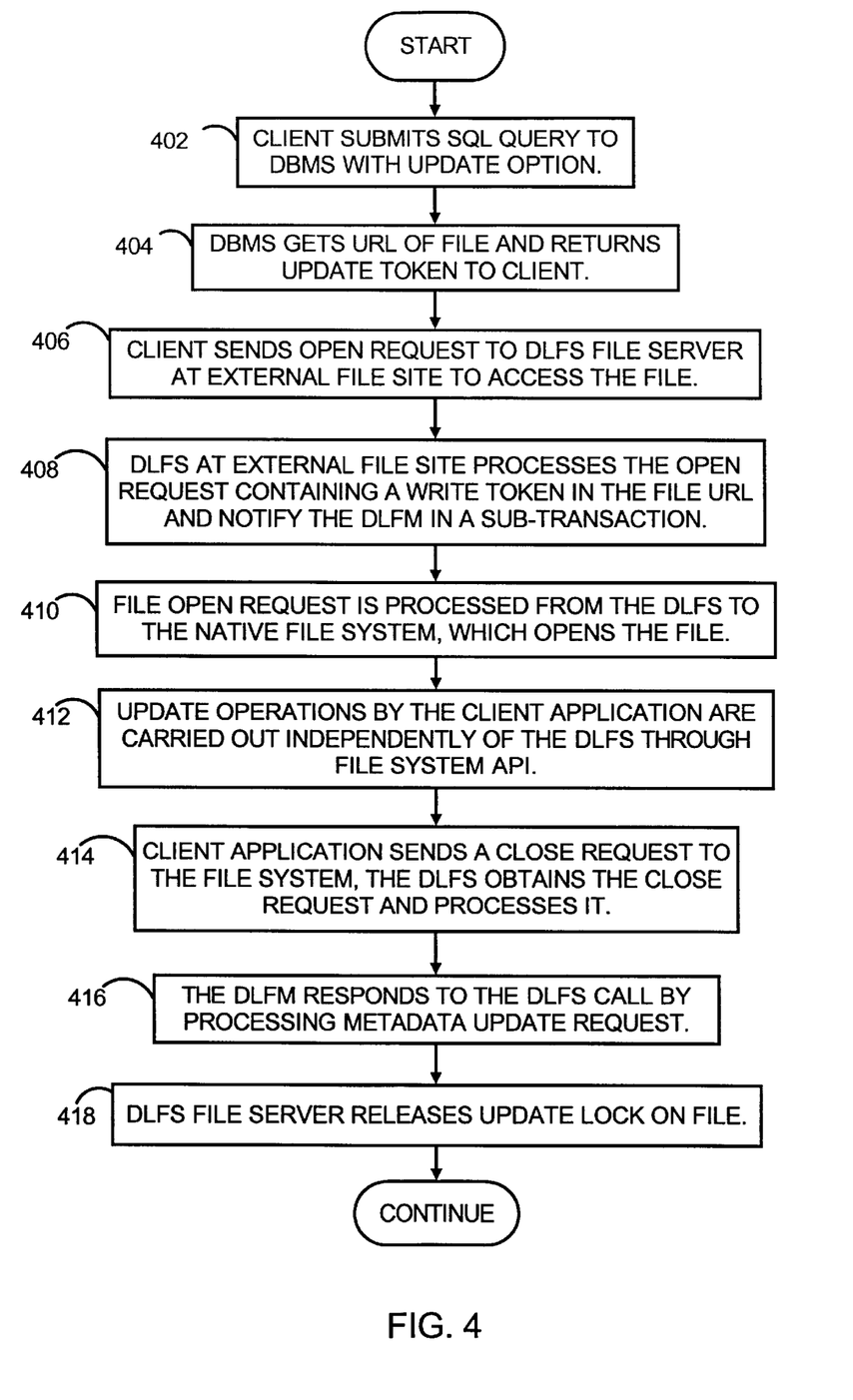
FIG. 4 is a flow diagram that illustrates the processing steps executed by the computer system of FIG. 1 to implement the update-in-place features in accordance with the present invention.

FIG. 4 is a flow diagram that illustrates the processing steps executed by the computer processing system 100 of FIG. 1 to implement the update-in-place operations in accordance with the present invention. In the first step, represented by the FIG. 4 flow diagram box numbered 402, a client operation specifying an UPDATE option, via a standard SQL and scalar function, is received by the DBMS, comprising a client request for retrieval of a file network location, which is sometimes called the Uniform Resource Locator (URL) of a file, with the intention to update the file object referenced by the URL. The UPDATE request implements the unique processing enabled by the present invention.

In the next step, the DBMS processes the UPDATE request based on whether the client has an update privilege on that data file and returns matching URL's, if any, and associated update tokens to the requesting client. This processing is represented by the flow diagram box numbered 404. As part of this processing, the DBMS retrieves the file object URL(s) that match the client's request. The file data object URL and token are returned to the requesting client. In the preferred embodiment, the URL and update token returned from the DBMS are combined together, and will be referred to as "URL+". The update token is prepared by existing token generation techniques, which will be well-known to those skilled in the art without further explanation. The update token will have an expiration timestamp. To support backup and restore operations common to many database systems, a unique recovery identifier (such as a timestamp or tail LSN) is generated for each update token returned to the client.

There may be read-write and write-write processing conflicts that the DBMS will be required to handle. There are several alternatives for such handling. First, the DBMS controlled file system may be designed with an isolation control capability that permits users to decide on a level of isolation they would like. For example, when a file is opened, the user may be permitted to pass an isolation control parameter to indicate what isolation level (shared or exclusive) is desired by the user. Another alternative for conflict handling is to deploy a lock manager in the DLFS component. This is described further below. A third alternative for conflict handling is to rely on the DBMS to provide the required isolation control, in which case a lock will be held for the client for each URL returned in step 404. With this alternative, a client cannot commit or rollback the current transaction, or update, until the desired file access has been completed. This has the effect of holding a lock while accessing the file and performing the file update operation, and is thus less desirable.

Next, in the processing step represented by the FIG. 4 flow diagram box numbered 406, the client sends the open file request to the appropriate file server. The server is identified by extracting the server name from the URL received in the prior processing. Those skilled in the art will be aware that an exemplary DB2 function suitable for this purpose is as follows in Function (1):

SQL_GetDataLinkAttr( . . . )    Function (1)

Alternatively, the client may use a scalar function in the original SQL statement to retrieve the server name and pathname. The client then sends an "Open (URL+)" command to the file server.

In the next processing step, represented by the flow diagram box numbered 408, the file open request is passed from the logical file system to the DLFS of the external file site. The processing of box 408 includes the DLFS determining if write access has been granted, in which case an access token is embedded in the compound URL+. Write access is indicated, for example, if the URL+ contains an embedded write token. The DLFS then determines if the write token is valid. If it is, then the DLFS requests a write lock on the object to be accessed. As described further below, in the preferred embodiment the write lock is obtained from a Lock Manager of the DLFS. With the write lock obtained, the DLFS next executes a subtransaction comprising the sending of an "Update_Pending(URL)" request to the DLFM.

The request for a write lock in the box 408 processing is performed to ensure that no other process modifies a file while the current update is in progress. Also, for readers with read token, read lock is acquired. This guarantees that read and write operations are serialized, and thus there will be no loss of an update nor reading of dirty data. Moreover, the "Update_Pending(URL)" request enforces update atomicity between the requested file and corresponding metadata maintained in the DLFM tables.

Figure 5:
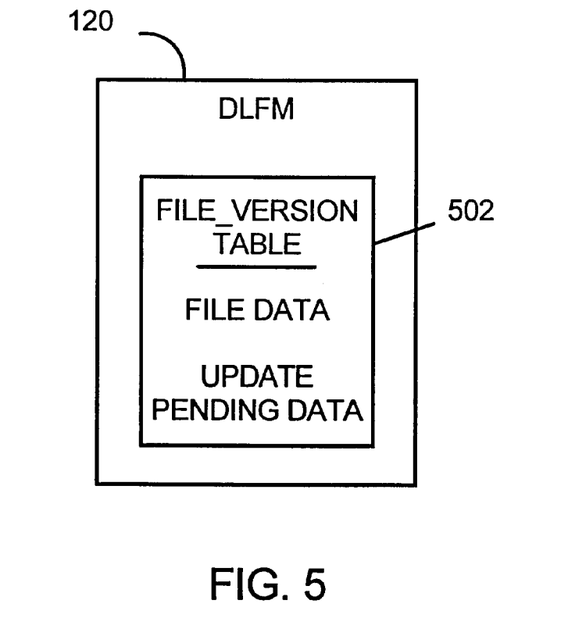
FIG. 5 is a block diagram representation of the DLFM shown in FIG. 1, illustrating that the DLFM of FIG. 1 includes a File_Version table.

As part of the box 408 processing, the DLFM processes the Update_Pending request by inserting a data record associated with the accessed object, including the unique recovery identifier information, into the File_Version table that it maintains. FIG. 5 is a representation of the DLFM 120 showing the File_Version table 502 maintained by the DLFM.

After the DLFM processing of the Update_Pending request, the DLFS continues the update-in-place processing by passing the file open request to the native file system at the external store. The requested file is then opened by the native file system and a file pointer is returned to the client. This operation is represented by the FIG. 4 flow diagram box numbered 410. All subsequent update processing on the requested file, including write and read operations, will then be carried out by the client application without any further intervention by either the DLFM or DLFS. Such subsequent update processing can be carried out using the API of the external store file system. These update operations are represented in FIG. 4 by the flow diagram box numbered 412.

When the client has completed update operations on the file, the client application will send a "Close" request to the file system, as noted in the FIG. 4 flow diagram box numbered 414. The Close request will be "intercepted" by the DLFS of the external store and will be forwarded to the underlying native file system, which implements the closing of the file. After the file is closed, the DLFS makes a "GetAttr" call to the native file system to determine if the file has been updated. If the file was updated, then the DLFS sends an "Update_Metadata" request to the DLFM to request update of the DLFM metadata associated with the updated file. The DLFS can check with the Lock Manager to see if the updated file is of interest and then send the "Update_Metadata" request. Those skilled in the art will appreciate that the DLFM maintains information called "metadata" that uniquely identifies each data file that is accessed through the DMBS. The unique identifier embedded in the URL+ code is passed to the DLFM by the DLFS in the call. If the file was not updated, then the DLFS will release the write lock and send a Reset_Pending request to the DLFM to reset the update pending "U" state by removing the record from the File_Version table. This processing is represented by the flow diagram box numbered 414. After the DLFS sends the calls to the DLFM in step 414, a DLFM daemon process will respond by servicing the requests, as represented by the flow diagram box numbered 416. In the preferred embodiment, the possible calls from the DLFS can be handled by the DLFM in one of three different ways, using different request types. These request types include an Update_Pending request, an Update_Metadata request, and a Reset_Pending request. The DLFM will automatically determine which of the three applies, and the DLFM daemon process will proceed accordingly.

For an Update_Pending request, the DLFM will simply insert a data record into the File_Version table 502 (shown in FIG. 5). For an Update_Metadata request, the DLFM will use the information received from the DLFS call to identify the metadata corresponding to the updated file. Then the DLFM daemon process updates the metadata information to reflect the new file state and schedule the updated file for archival processing, in accordance with the DBMS/Datalinks system. This results in a new entry to the File_Version table 502, in which are stored the unique file identification and the archive file name. The File_Version table is used for restoring the correct file version from archival storage after a restore operation at the DBMS. After the archival operation is scheduled, the DLFM daemon process sends a reply message back to the DLFS to release the lock on the accessed object. The archival operation is performed asynchronously by a separate process. For a Reset_Pending request, the DLFM daemon deletes the corresponding record for the file from the File_Version table. In the case of the Reset_Pending operation, no reply message to the DLFS is needed.

After DLFM has completed servicing the Update_Metadata request, it sends a reply back to DLFS. DLFS then releases the lock, if any, on the object. In the case that an error occurs in the DLFM, the DLFM would block out any further access by shutting down the system or locking out the file from further access. This completes the processing of the file update. The client can then update other files and otherwise continue with its operation. This processing is represented by the FIG. 4 flow diagram box numbered 418.

DLFM Processing after System Failure

Currently, host database crash recovery processing triggers a "resync" daemon process and, in the "DATALINKS" product mentioned above, resolves DLFM in-doubt transactions. When crash recovery processing has completed, all in-doubt transactions at the DLFM will either be committed or aborted. With update in-place support such as described above, files could be in an update pending state when the system crashes, and unfortunately current crash recovery processing is not designed to resolve the update pending state.

To resolve all inconsistency states, including update pending state and thereby handle this crash recovery problem, DLFM daemon startup processing will check whether DLFM/DLFS operations were shut down without problems in a normal exit shut-down sequence. If it was, then the DLFM startup and initialization processing will be performed in a conventional manner, which will be familiar to those skilled in the art. For example, the "DATALINKS" product described above implements startup processing in accordance with a UDB 5.2 specification, and those skilled in the art will recognize that the conventional "DATALINKS" product does not first check for file update pending as part of DLFM startup processing. In the preferred embodiment of the invention, if the DLFM daemon startup process detects that the DLFM was shut down due to a system or process failure, then the DLFM main daemon process will perform a local crash recovery operation before starting any other daemon processes. Thus, the DLFM crash recovery processing works as described in the following pseudocode of Table 1:

TABLE 1

DLFM daemon:

(1) DLFM main daemon scans File_Version table;
(2) For every table entry for which pending_flag = File_In_Update:
    + restore the immediate previous version of the file from archive if necessary
    + reset pending flag.

With this processing, files that are in an update-pending state when there is a system crash will be resolved during crash recovery processing by performing the local crash recovery routine described above in Table 1 before any other DLFM daemon processing at startup.

Coordinated Database Restore

When a "linked" file (a file whose access is under database system control) is updated, the preferred embodiment makes an archive copy of the updated file. Each archived version of the updated file is associated with a unique identifier and the information is stored in the File_Version table. In a restore operation, after restoring the database to a condition at a specific point in time in the past, the corresponding files would also have to be restored from the archive to match the restored database state, or condition. To do so, the database system can start a reconciliation process to synchronize the database state and the file system state. The following are the steps the system performs for such reconciliation processing.

(a) A database agent sets an identifier (called db_state_id) for the current database state which can be implemented by a time stamp or tail LSN.

(b) The database agent scans the catalog tables to identify all user tables having one or more columns with a Datalink data type that support the update-in-place processing described herein.

(c) For each table found, the database agent scans the table and extracts the datalink column value (URL) from each record.

(d) The agent inserts the extracted URL into a message block and sends it, along with the database state identifier db_state_id, to a DLFM daemon process.

(e) The DLFM daemon process uses the URL and db_state_id to look up the corresponding entry in a DLFM table (the File_Version table) and then extracts the archive file name from the DLFM table entry. When there is more than one entry with the same URL, the one with the greatest value of unique recovery id that is smaller than or equal to the received db_state_id is selected.

(f) The DLFM daemon process then restores the file to the file system from the archive device if the file is not already in the file system.

When all the tables have been processed, all files in the file system that are linked to the database system will have been restored to match the requested database state.

Figure 7:
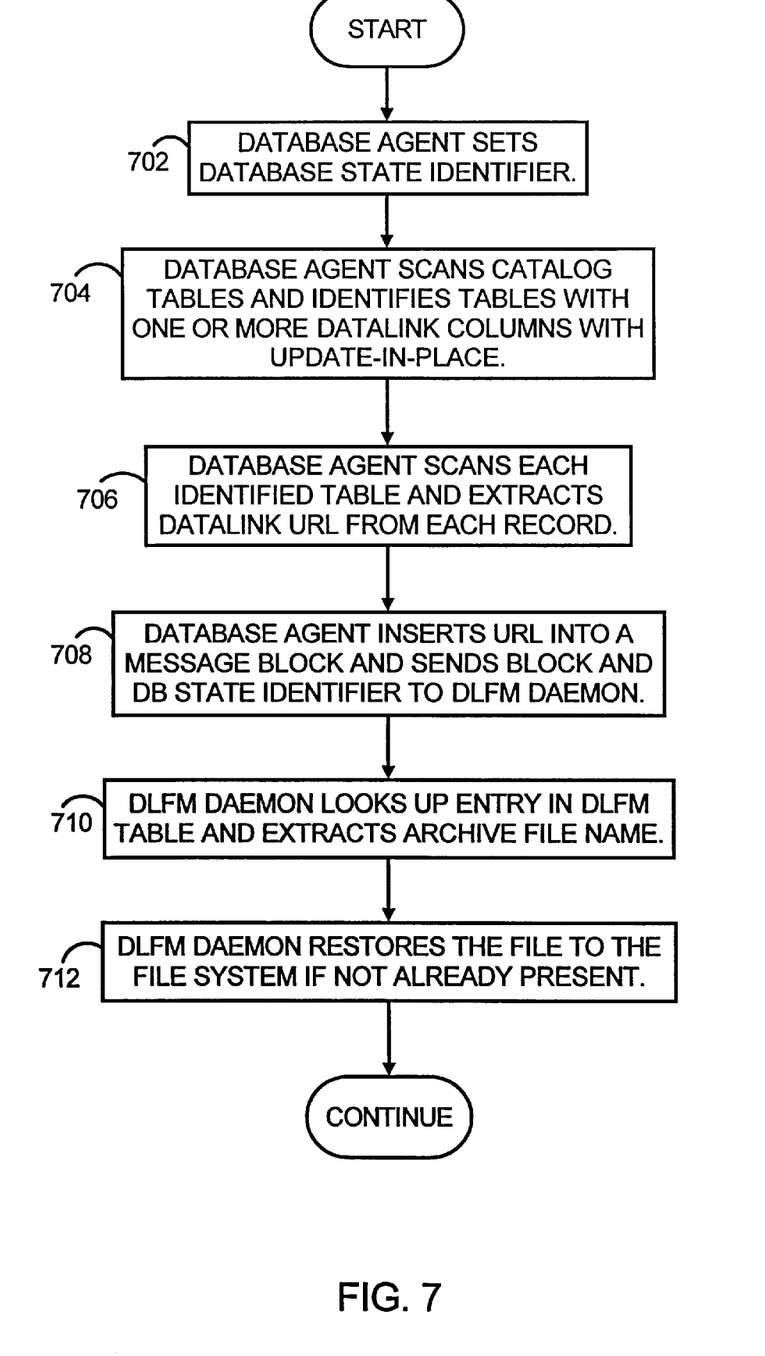
FIG. 7 is a flow diagram that illustrates the processing steps executed by the computer system of FIG. 1 to implement the coordinated database restore operation in accordance with the present invention.

FIG. 7 is a flow diagram that illustrates the processing steps executed by the computer processing system 100 of FIG. 1 to implement the coordinated database restore operation. The flow diagram illustrates the operation steps described above. Thus, in the first processing step, a database agent sets an identifier for the current database state, which can include time stamp data. This processing is represented by the flow diagram box numbered 702, and corresponds to step (a) above. Next, the database agent scans the catalog tables to identify all user tables having one or more columns with Datalink data types that support the update-in-place processing described herein. This step is represented by box 704 in FIG. 7, and step (b) above. Next, for each table found, the database agent scans the table and extracts the URL from each record, as represented by box 706 and step (c). In the processing represented by box 708 of FIG. 7 (and step (d) above), the database agent inserts the extracted URL into a message block and sends it, along with the database state identifier db_state_id, to a DLFM daemon process.

The DLFM daemon process then uses the URL and db_state_id to look up the corresponding entry in a DLFM table (the File_Version table) and then extracts the archive file name from the database table entry. This processing is represented by the flow diagram box numbered 710. As part of the box 710 processing, when there is more than one entry with the same URL, the one with the greatest unique recovery id value that is smaller than or equal to the received db_state_id is the one selected (this is also represented by the step (e) processing described above). Finally, in the box represented by the flow diagram box numbered 712, the DLFM daemon process restores the file to the file system from the archive device, if the file is not already in the file system. This corresponds to the step (f) processing described above.

Additional System Components

As noted above, a file UPDATE request represents new DBMS processing enabled by the present invention. Thus, the DBMS 104 (FIG. 1) includes processing that accepts the UPDATE requests and in response carries out the processing described in conjunction with the flow diagram of FIG. 4. More particularly, the DBMS responds to a client UPDATE request with the name of the data object, or file, to be updated (the URL) along with an embedded update token (URL+). In addition, a unique recovery identifier (such as a timestamp value at the time of the UPDATE request) is returned as part of the compound URL+ referred to above. It is this URL+ data that is processed by the DLFS before forwarding the request to the native file system at the external store.

Figure 6:
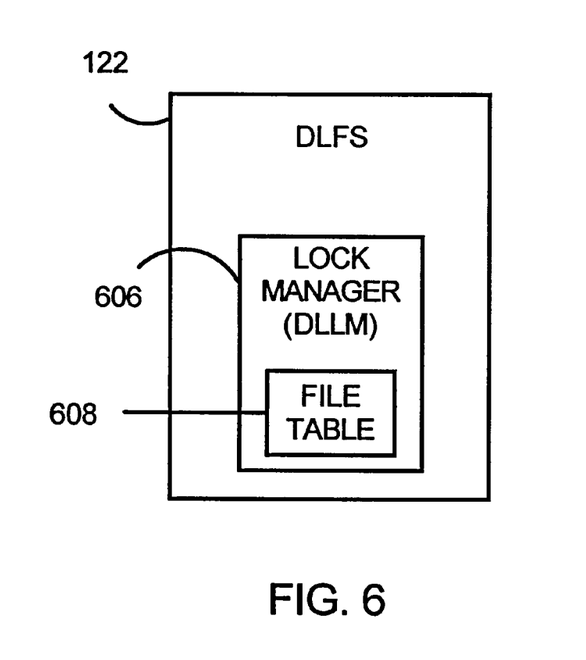
FIG. 6 is a block diagram representation of the DLFS shown in FIG. 1, illustrating that the DLFS of FIG. 1 includes a lock manager DLLM component.

Further as noted above, read and write operations must be serialized to provide access and isolation control. Two alternative ways of achieving this are by either file locking or database locking. In the preferred embodiment, a file locking technique is used, wherein the DLFS incorporates a data lock manager, represented in FIG. 6 by the DLLM 606 component of the DLFS 122. A variety of locks can be implemented to control access and can be specified by the user in the UPDATE request. An update "U" lock may be placed on a data file to prevent other users from updating the same data file concurrently, which could result in loss of an update operation. A read "R" lock is compatible with a "U" lock, in that concurrent reading is permitted by an "R" lock even if a file is already associated with a "U" lock. The "R" lock may, however, permit reading "dirty" data. Therefore, a system constructed in accordance with the present invention also provides the option of a more restrictive lock mode, called a "W" lock, that can be requested by a user to apply to an update request. The W lock will serialize both read and write to a file, but could unnecessarily block access to a file. If it is desirable to avoid such blocking, then a versioning scheme can be used. The versioning scheme uses the DBMS to create a new file version that is similar to a check-out and check-in scheme that will be familiar to those skilled in the art. Alternatively, a new file version can be created by the DLFS via buffering the update changes before the file itself is closed. Creating new file versions, however, is not preferred.

As described above, the DLFS component of the system constructed in accordance with the invention permits update-in-place for files that are linked by the DBMS. The DLFS performs this by intercepting certain file system calls from the DBMS client. Such intercepted calls will typically comprise Open, Rename, and Delete calls. If an update control mode is desired, then a Close call also should be intercepted by the DLFS, with a resulting call to the DLFM, as described above. The DLFS component can manage read and write operations to different versions of a file, if versioning by the DLFS is desired.

The lock manager DLLM 606 (FIG. 6) of the DLFS maintains a file table 608 that keeps track of all currently opened files and their corresponding access modes. For every new open request, the DLLM examines the table to determine whether a conflict in file access has occurred. If there is no conflict between users requesting access, then the DLLM updates the file table 608 and grants access. The Open request is otherwise refused, or blocked, and the requesting DBMS client is so informed.

As described above, the DLFM must process DLFS calls such as Update_Pending, Update_Metadata, and Reset_Pending. For processing the Update_Metadata call, the DLFM will obtain file information from the file system (DLFS) and will update the metadata associated with the file that has been updated. In addition, the DLFM will schedule the archival of the updated file. To easily identify different versions, the DLFM will include an attribute called Version_Num in the File_Version table it maintains. The File_Version table will be used to keep track of different file versions and will have the attributes listed and defined in FIG. 3 above. It should be understood that the information contained in the File_Version table may be stored in a single table, as described above, or the information may be stored in multiple tables, if desired. For example, the DLFM could include an Update Pending table in addition to the File_Version table, wherein the Update_Pending table also would be maintained by the DLFM and would contain file identification information and status flag information that indicates if an update operation is pending. This type of two-table approach incurs minimal duplication of update pending information in an Update_Pending table and in the File_Version table, but provides the advantage that only the Update_Pending table need be searched for the update pending information during certain startup and crash recovery operations. Thus, the two-table approach eliminates the need to search the entire File_Version table for the update pending information.

Advantages of the Invention

As described above, the present invention provides a computer system that updates a data object maintained in data storage external to a database management system (DBMS), after receiving an update request from a DBMS client for the data object, by first scheduling the update request with the DBMS to provide access to the external data object, then initiating a subtransaction in the DBMS for the update request to ensure consistency between the data object and corresponding metadata of the data object, next updating the data object with an in-place update action at the external data storage to thereby produce an updated data object and also updating the DBMS/DLFM metadata of the data object, then appending information relating to type and time of the update action in an object version table, and then executing a backup operation of the updated data object. This sequence of steps permits update-in-place operations on the external data object, under supervision of the DBMS. In this way, the system supports update operations on external data with access control, backup and recovery, and transaction consistency in accordance with a database management system, while avoiding large copy operations that would consume network resources.

The present invention has been described above in terms of a presently preferred embodiment so that an understanding of the present invention can be conveyed. There are, however, many configurations for data base management systems not specifically described herein but with which the present invention is applicable. The present invention should therefore not be seen as limited to the particular embodiments described herein, but rather, it should be understood that the present invention has wide applicability with respect to data base management systems generally. All modifications, variations, or equivalent arrangements and implementations that are within the scope of the attached claims should therefore be considered within the scope of the invention.

We claim:

1. A method of updating a data object in a computer network system, the method comprising:
    receiving one or more update request from multiple computer network clients at a data base system on a first node of the network for access to a data object that is maintained in data storage on a file site node of the network, wherein the data object is external relative to the database system and wherein the multiple computer network clients operate on one or more client nodes and wherein the one or more client nodes are separate from the file site node;
    updating the data object with an in-place update action at the external data storage on the file site node, wherein the in-place update comprises the steps of:
        determining if write access has been granted to the data object;
        requesting a write lock on the data object;
        inserting an associated data record into a file version table, wherein the associated data record comprises a unique recovery identifier that identifies the type and time of the update action;
        updating the data object through processing performed on the file site node; and
        updating the corresponding metadata if the data object was updated;
    appending information relating to type and time of the update action in a file version table; and
    executing a backup operation of the updated data object upon completion.

2. The method as recited in claim 1, wherein the object is linked to the database and access to the object is controlled by the database.

3. A method as defined in claim 1, wherein the step of updating comprises performing an update action in accordance with an operating system that is native to the external data storage.

4. A method as defined in claim 3, wherein the step of providing access and the step of updating are performed in accordance with the native operating system of the external data storage.

5. A method as defined in claim 3, wherein the update action is performed in accordance with the native operating system of the external data storage and independently of a file server operating system that controls access to the data object.

6. A method as defined in claim 1, wherein the step of providing access includes receiving an update token at the network client corresponding to the update request.

7. A method as defined in claim 1, wherein the step of initiating a subtransaction comprises embedding a write token in a network uniform resource locator (URL) address of the data object.

8. A method as defined in claim 1, wherein the data object comprises a structured, semi-structured, or unstructured object.

9. A method as defined in claim 1, wherein the file version table includes modification information that describes the update operation and a unique identifier that is used to reconcile any differences between the stored data object and the corresponding metadata in the event of failure and/or database restore.

10. A computer network system comprising:
    a central processing unit at a first node of the computer network; and
    a database management system executing at the first node for updating a data object in the computer network system wherein the database management system is for:
        performing data object updating in response to receiving one or more update request from one or more computer network clients for access to a data object that is maintained in data storage on a file site node of the network, wherein the data object is external relative to the database system and wherein the multiple computer network clients operate on one or more client nodes and wherein the one or more client nodes are separate from the file site node,
        updating the data object with an in-place update action at the external data storage on the file site node, wherein the in-place update comprises the steps of:
            determining if write access has been granted to the data object;
            requesting a write lock on the data object;
            inserting an associated data record into a file version table, wherein the associated data record comprises a unique recovery identifier that identifies the type and time of the update action;
            updating the data object through processing performed on the file site node; and
            updating the corresponding metadata if the data object was updated;
        appending information relating to type and time of the update action in a file version table; and
        executing a backup operation of the updated data object upon completion.

11. A system as defined in claim 10, wherein the update action is performed in accordance with an operating system that is native to the external data storage, other than the database management system.

12. A system as defined in claim 11, wherein the system provides access and performs the updating in accordance with the native operating system of the external data storage.

13. A system as defined in claim 11, wherein the update action is performed in accordance with the native operating system of the external data storage and independently of a file server operating system that controls access to the data object.

14. A system as defined in claim 10, wherein access to the data object is provided by receiving an update token at the network client corresponding to the update request.

15. A system as defined in claim 10, wherein the subtransaction is initiated by embedding a write token in a network uniform resource locator (URL) address of the data object.

16. A system as defined in claim 10, wherein the data object comprises a structured, semi-structured, or unstructured object.

17. A system as defined in claim 10, wherein the file version table includes modification information that describes the update operation and a unique identifier that is used to reconcile any differences between the stored data object and the corresponding metadata in the event of failure and/or database restore.

18. A method of updating a data object under database control in a computer network system, the method comprising:

receiving one or more update request from multiple computer network clients at a database system at a first node of the network for access to a data object that is maintained in data storage on a file site node of the network, wherein the data object is external relative to the database system and wherein the multiple computer network clients operate on one or more client nodes and wherein the one or more client nodes are separate from the file site node;

initiating a subtransaction to be performed on the file site node, whereby the step of initiating the subtransaction embeds a write token in a network uniform resource locator (URL) address of the data object to thereby serially provide access to the data object and ensure consistency between the data object and corresponding metadata of the data object;

updating the data object with an in-place update action at the external data storage on the file site node in accordance with the operating system native to the external data storage and independently of a file server operating system that controls access to the data object, wherein the in-place update comprises the steps of:
  determining if write access has been granted to the data object;
  requesting a write lock on the data object;
  inserting an associated data record into a file version table, wherein the associated data record comprises a unique recovery identifier that identifies the type and time of the update action;
  updating the data object through processing performed on the file site node; and
  updating the corresponding metadata if the data object was updated;

appending information relating to type and time of the update action in a file version table; and executing a backup operation of the updated data object upon completion.

19. A method as defined in claim 18, wherein the data object comprises a structured, semi-structured, or unstructured object.

20. A method as defined in claim 18, wherein the file version table includes modification information that describes the update operation and a unique identifier that is used to reconcile any differences between the stored data object and the corresponding metadata in the event of failure and/or database restore.

21. A program product for use in a computer system that executes program steps recorded in a computer readable media to perform a method for updating a data object in a computer network system, the program product comprising:

a recordable media;

a program of computer-readable instructions executable by the computer system to perform steps comprising:

receiving one or more update request from multiple computer network clients at a data base system on a first node of the network for access to a data object that is maintained in data storage on a file site node of the network, wherein the data object is external relative to the database system and wherein the multiple computer network clients operate on one or more client nodes and wherein the one or more client nodes are separate from the file site node;

updating the data object with an in-place update action at the external data storage on the file site node, wherein the in-place update comprises the steps of:
  determining if write access has been granted to the data object;
  requesting a write lock on the data object;
  inserting an associated data record into a file version table, wherein the associated data record comprises a unique recovery identifier that identifies the type and time of the update action;
  updating the data object through processing performed on the file site node; and
  updating the corresponding metadata if the data object was updated;

appending information relating to type and time of the update action in a file version table; and executing a backup operation of the updated data object upon completion.

22. A program product as defined in claim 21, wherein the program step of updating comprises performing an update action in accordance with an operating system that is native to the external data storage.

23. A program product as defined in claim 22, wherein the program step of providing access and the program step of updating are performed in accordance with the native operating system of the external data storage.

24. A program product as defined in claim 22, wherein the update action is performed in accordance with the native operating system of the external data storage and independently of a file server operating system that controls access to the data object.

25. A program product as defined in claim 21, wherein the program step of providing access includes receiving an update token at the network client corresponding to the update request.

26. A program product as defined in claim 21, wherein the program step of initiating a subtransaction comprises embedding a write token in a network uniform resource locator (URL) address of the data object.

27. A program product as defined in claim 21, wherein the data object comprises a structured, semi-structured, or unstructured object.

28. A program product as defined in claim 20, wherein the file version table includes modification information that describes the update operation and a unique identifier that is used to reconcile any differences between the stored data object and the corresponding metadata in the event of failure and/or database restore.

* * * * *